United States Patent
Viswanathan

(10) Patent No.: US 11,193,789 B2
(45) Date of Patent: Dec. 7, 2021

(54) METHOD, APPARATUS, AND COMPUTER PROGRAM PRODUCT FOR IDENTIFYING AT-RISK ROAD INFRASTRUCTURE

(71) Applicant: HERE Global B.V., Eindhoven (NL)

(72) Inventor: Anirudh Viswanathan, Berkeley, CA (US)

(73) Assignee: HERE GLOBAL B.V., Eindhoven (NL)

(*) Notice: Subject to any disclaimer, the term of this patent is extended or adjusted under 35 U.S.C. 154(b) by 293 days.

(21) Appl. No.: 16/229,383

(22) Filed: Dec. 21, 2018

(65) Prior Publication Data
US 2020/0201891 A1    Jun. 25, 2020

(51) Int. Cl.
*G01C 21/00* (2006.01)
*G06F 16/29* (2019.01)
(Continued)

(52) U.S. Cl.
CPC ......... *G01C 21/3841* (2020.08); *G01C 21/32* (2013.01); *G06F 16/235* (2019.01);
(Continued)

(58) Field of Classification Search
CPC .. G06F 16/29; G06F 16/2358; G06F 16/2365; G06F 16/235; G01C 21/32; G06T 7/001; G06T 2207/30184; G06T 2207/30108; G06N 3/0454; G06N 3/08; G01S 19/00
See application file for complete search history.

(56) References Cited

U.S. PATENT DOCUMENTS

2017/0008521 A1* 1/2017 Braunstein ......... G01C 21/3602
2019/0025071 A1* 1/2019 Fukui .................... G09B 29/00

FOREIGN PATENT DOCUMENTS

WO    WO 2018/072915 A1    4/2018

OTHER PUBLICATIONS

Drost, Felix, Luca Parolini, and Sebastian Schneider. "Siamese Networks for Online Map Validation in Autonomous Driving." [online] Retrieved Dec. 5, 2020. URL<https://lucaparolini.com/pdf/0487_FI.pdf> Published: Oct. 2020 (Year: 2020).*

(Continued)

*Primary Examiner* — James J Lee
*Assistant Examiner* — Shon G Foley
(74) *Attorney, Agent, or Firm* — Alston & Bird LLP

(57) ABSTRACT

A method, apparatus and computer program product are provided for predicting the likelihood that road infrastructure has changed. Methods may include: receiving sensor data from a sensor network of a first environment; identifying first map data of an environment, where the first map data is identified based on visual similarity to the first environment, where the first map data includes a history of map updates; identifying second map data of an environment, where the second map data is identified based on visual similarity to the first environment; analyzing the sensor data against the first map data and the second map data to establish correspondence between the sensor data and the first map data and between the sensor data and the second map data; and identifying the first environment as a location of at-risk infrastructure based on the sensor data corresponding to the first map data.

20 Claims, 4 Drawing Sheets

(51) Int. Cl.
    *G01C 21/32*     (2006.01)
    *G06F 16/23*     (2019.01)
    *G06T 7/00*     (2017.01)
    *G06N 3/04*     (2006.01)

(52) U.S. Cl.
    CPC ...... *G06F 16/2358* (2019.01); *G06F 16/2365* (2019.01); *G06F 16/29* (2019.01); *G06T 7/001* (2013.01); *G06N 3/0454* (2013.01); *G06T 2207/30108* (2013.01); *G06T 2207/30184* (2013.01)

(56) References Cited

OTHER PUBLICATIONS

Shen, Y. et al., Learning Deep Neural Networks for Vehicle Re-ID With Visual-Spatio-Temporal Path Proposals, Research Paper, The Chinese University of Hong Kong (dated Aug. 13, 2017) 10 pages.

\* cited by examiner

METHOD, APPARATUS, AND COMPUTER PROGRAM PRODUCT FOR IDENTIFYING AT-RISK ROAD INFRASTRUCTURE

TECHNOLOGICAL FIELD

An example embodiment relates generally to the determining when road infrastructure is likely to have changed and, more particularly, to predicting the likelihood that road infrastructure has changed based on a location similarity to other locations within a road network and identifying their historical changes, and a likelihood of change calculated from a history of map updates.

BACKGROUND

Probe points are frequently captured by global positioning systems ("GPS"), navigation systems or the like. Each probe point is associated with a location, such as may be expressed in terms of latitude and longitude. Some probe points are also associated with a heading and a speed at which the GPS system or the navigation system was moving at the time at which the probe point was captured. Vehicles are increasingly being equipped with varying degrees of sensors which may provide data relating to various aspects of the environment of a vehicle as it travels along a road. This data may be invaluable in determining features of a road.

The probe data from vehicles traveling along the road segments may be used to inform map updates of road changes (e.g., properties of the road segment or a path of the road segment) and may inform traffic levels along the road segment. However, due to the variability of probe data, this crowd sourced data may generally be used to update map data when the map data is initially created from known-true data.

BRIEF SUMMARY

A method, apparatus and computer program product are provided in accordance with an example embodiment in order to crowd source map data and for using the crowd sourced map data to identify at-risk road infrastructure. Embodiments described herein may provide an apparatus including at least one processor and at least one non-transitory memory including program code instructions. The computer program code instructions may be configured to, when executed, cause the apparatus to: receive sensor data from a sensor representative of a first environment at a location along a road segment of a road network; identify first map data of an environment, where the first map data is identified based on visual similarity to the first environment, where the first map data includes a history of map data updates; identify second map data of an environment, where the second map data is identified based on visual similarity to the first environment, where the second map data does not include a history of map data updates; identify the first environment as a location of at-risk infrastructure in response to the sensor data corresponding to the first map data; and provide an indication to a map data service provider of a map update request for the location along the road segment.

According to some embodiments, causing the apparatus to analyze the sensor data against the first map data and the second map data to establish correspondence between the sensor data and the first map data and between the sensor data and the second map data may include causing the apparatus to: apply a Siamese network to the sensor data and the first map data to establish a contrast between the sensor data and the first map data; and apply the Siamese network to the sensor data and the second map data to establish a contrast between the sensor data and the second map data. Causing the apparatus to apply a Siamese network to the sensor data and the first map data may include causing the apparatus to differentiate visual similarity of the sensor data of the first map data from map update similarity of the sensor data from the first map data.

The apparatus of some embodiments may be configured to: identify a history of map updates for features in a map of the road network; identify features of the environment corresponding to features having a history of map updates; and determine a change likelihood based on the identified features of the environment corresponding to features having a history of map updates. Causing the apparatus to identify the first environment as a location of at-risk infrastructure in response to the sensor data corresponding to the first map data includes causing the apparatus to identify the first environment as a location of at-risk infrastructure in response to the sensor data corresponding to the first map data and the change likelihood satisfying a predetermined criteria. Causing the apparatus to provide an indication to a map data service provider of a map update request for the location along the road segment includes causing the apparatus to generate a request for map data collection at the location along the road segment. The apparatus may be caused to provide an indication to an autonomous vehicle proximate the location along the road segment of an uncertainty of road infrastructure at the location along the road segment.

Embodiments provided herein may include a computer program product including at least one non-transitory computer-readable storage medium having computer-executable program code instructions stored therein. The computer-executable program code portions may include program code instructions to: receive sensor data from a sensor representative of a first environment at a location along a road segment of a road network; identify first map data of an environment, where the first map data may be identified based on visual similarity to the first environment, where the first map data may include a history of map data updates; identify second map data of an environment, where the second map data may be identified based on visual similarity to the first environment, where the second map data does not include a history of map data updates; analyze the sensor data against the first map data and the second map data to establish correspondence between the sensor data and the first map data and between the sensor data and the second map data; identify the first environment as a location of at-risk infrastructure in response to the sensor data corresponding to the first map data; and provide an indication to a map data service provider of a map update request for the location along the road segment.

The program code instructions to analyze the sensor data against the first map data and the second map data to establish correspondence between the sensor data and the first map data and between the sensor data and the second map data may include program code instructions to: apply a Siamese network to the sensor data and the first map data to establish a contrast between the sensor data and the first map data; and apply the Siamese network to the sensor data and the second map data to establish a contrast between the sensor data and the second map data. The program code instructions to apply a Siamese network to the sensor data and the first map data may include program code instructions to differentiate visual similarity of the sensor data of the first map data from map update similarity of the sensor data from the first map data. Embodiments may include program code instructions to: identify a history of map updates for features in a map of the road network; identify features of the environment corresponding to features having a history of map updates; and determine a change likelihood based on the identified features of the environment corresponding to features having a history of map updates.

The program code instructions to identify the first environment as a location of at-risk infrastructure in response to the sensor data corresponding to the first map data may include program code instructions to identify the first environment as a location of at-risk infrastructure in response to the sensor data corresponding to the first map data and the change likelihood satisfying a predetermined criteria. The program code instructions to provide an indication to a map data service provider of a map update request for the location along the road segment may include program code instructions to generate a request for map data collection at the location along the road segment. Embodiments may include program code instructions to provide an indication to an autonomous vehicle proximate the location along the road segment of an uncertainty of road infrastructure at the location along the road segment.

Embodiments provided herein may include a method. Methods may include: receiving sensor data from a sensor network representative of a first environment at a location along a road segment of a road network; identifying first map data of an environment, where the first map data is identified based on visual similarity to the first environment, where the first map data includes a history of map updates; identifying second map data of an environment, where the second map data is identified based on visual similarity to the first environment, where the second map data does not include a history of map data updates; analyzing the sensor data against the first map data and the second map data to establish correspondence between the sensor data and the first map data and between the sensor data and the second map data; identifying the first environment as a location of at-risk infrastructure in response to the sensor data corresponding to the first map data; and providing an indication to a map data service provider of a map update request for the location along the road segment.

According to some embodiments, analyzing the sensor data against the first map data and the second map data to establish correspondence between the sensor data and the first map data and between the sensor data and the second map data may include: applying a Siamese network to the sensor data and the first map data to establish a contrast between the sensor data and the first map data; and applying the Siamese network to the sensor data and the second map data to establish a contrast between the sensor data and the second map data. Applying a Siamese network to the sensor data and the first map data may include differentiating visual similarity of the sensor data of the first map update similarity of the sensor data from the first map data.

Methods may include: identifying a history of map updates for features in a map of the road network; identifying features of the environment corresponding to features having a history of map updates; and determining a change likelihood based on the identified features of the environment corresponding to features having a history of map updates. Identifying the first environment as a location of at-risk infrastructure in response to the sensor data corresponding to the first map data may include identifying the first environment as a location of at-risk infrastructure in response to the sensor data corresponding to the first map data and the change likelihood satisfying a predetermined criteria. Providing an indication to a map data service provider of a map update request for the location along the road segment may include generating a request for map data collection at the location along the road segment.

Embodiments provided herein may include an apparatus. The apparatus may include: means for receiving sensor data from a sensor network representative of a first environment at a location along a road segment of a road network; means for identifying first map data of an environment, where the first map data is identified based on visual similarity to the first environment, where the first map data includes a history of map updates; means for identifying second map data of an environment, where the second map data is identified based on visual similarity to the first environment, where the second map data does not include a history of map data updates; means for analyzing the sensor data against the first map data and the second map data to establish correspondence between the sensor data and the first map data and between the sensor data and the second map data; means for identifying the first environment as a location of at-risk infrastructure in response to the sensor data corresponding to the first map data; and means for providing an indication to a map data service provider of a map update request for the location along the road segment.

According to some embodiments, the means for analyzing the sensor data against the first map data and the second map data to establish correspondence between the sensor data and the first map data and between the sensor data and the second map data may include: means for applying a Siamese network to the sensor data and the first map data to establish a contrast between the sensor data and the first map data; and means for applying the Siamese network to the sensor data and the second map data to establish a contrast between the sensor data and the second map data. The means for applying a Siamese network to the sensor data and the first map data may include means for differentiating visual similarity of the sensor data of the first map update similarity of the sensor data from the first map data.

An example apparatus may include: means for identifying a history of map updates for features in a map of the road network; means for identifying features of the environment corresponding to features having a history of map updates; and determining a change likelihood based on the identified features of the environment corresponding to features having a history of map updates. The means for identifying the first environment as a location of at-risk infrastructure in response to the sensor data corresponding to the first map data may include identifying the first environment as a location of at-risk infrastructure in response to the sensor data corresponding to the first map data and the change likelihood satisfying a predetermined criteria. The means for providing an indication to a map data service provider of a map update request for the location along the road segment may include generating a request for map data collection at the location along the road segment.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
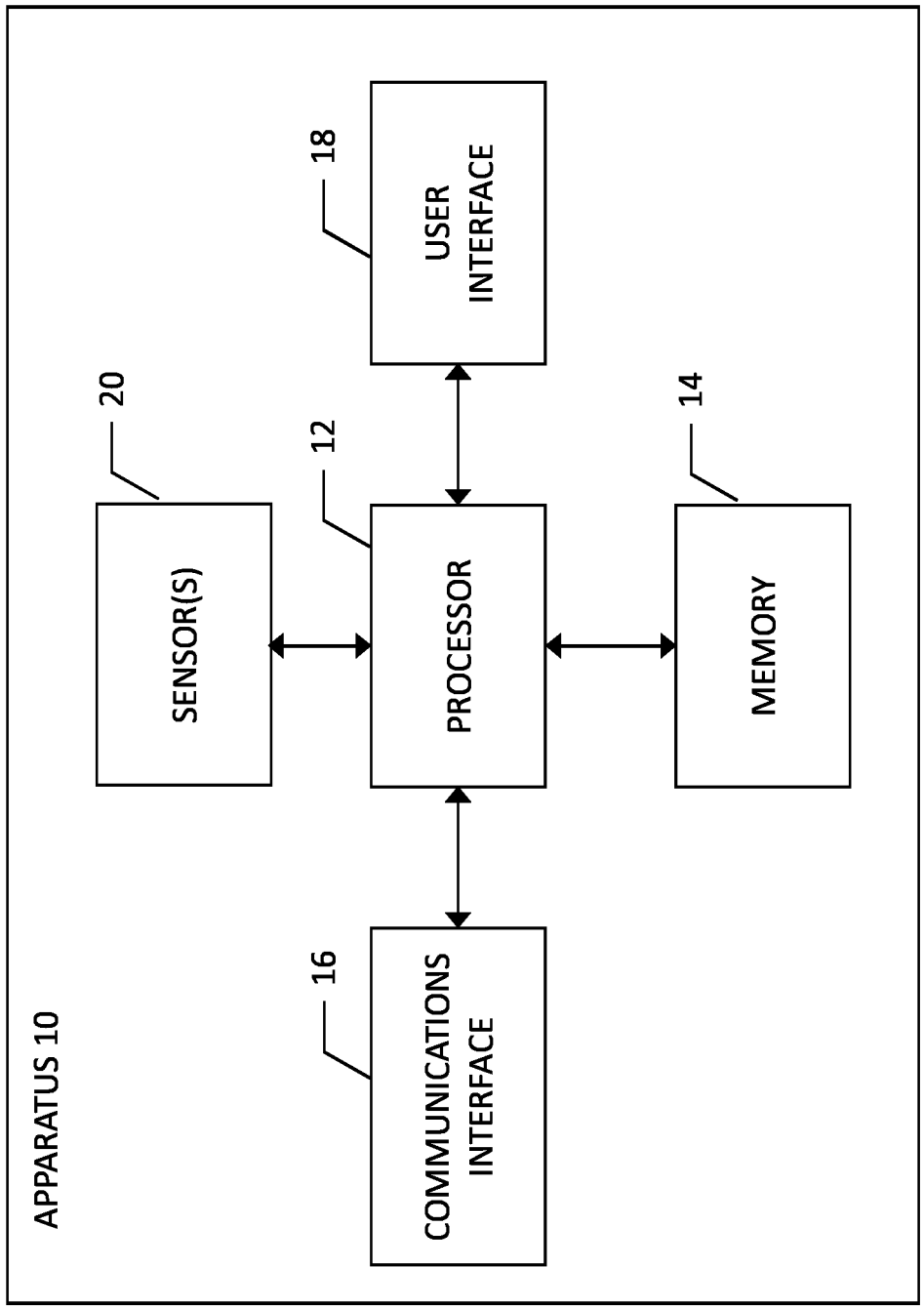
Figure 2:
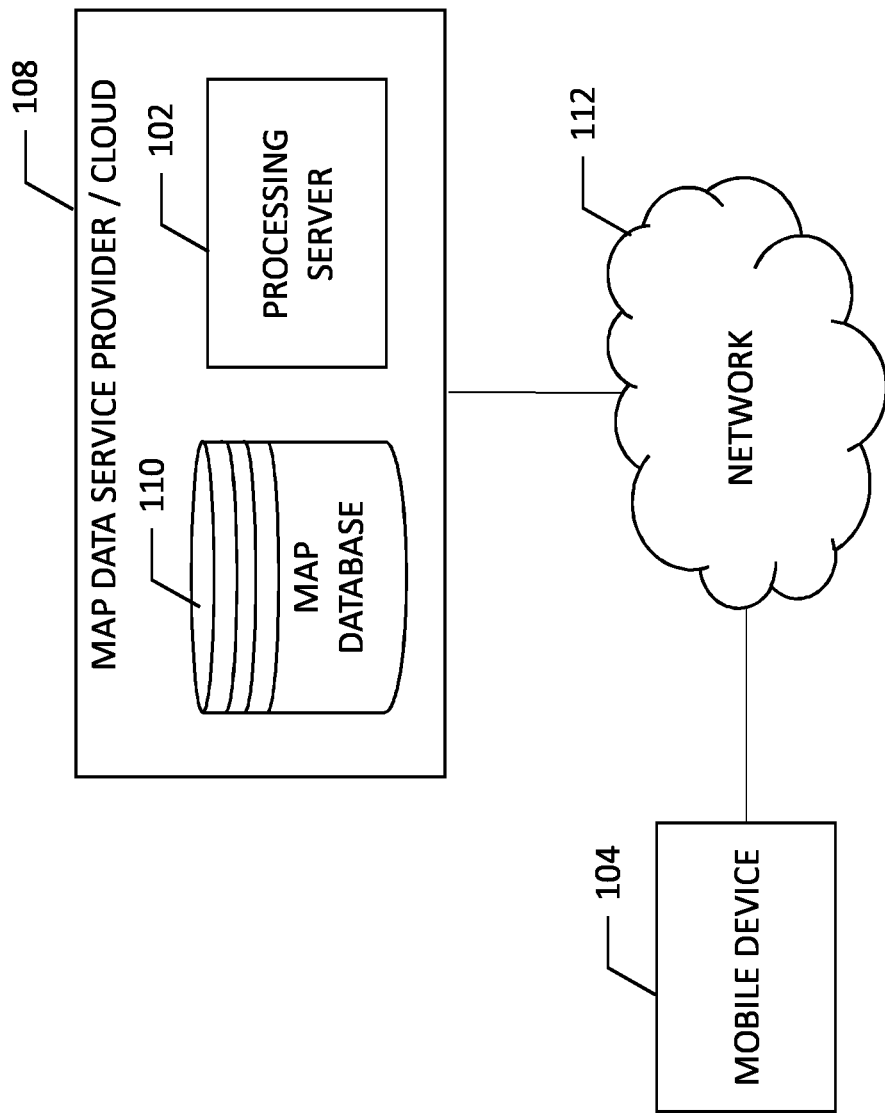
Figure 3:
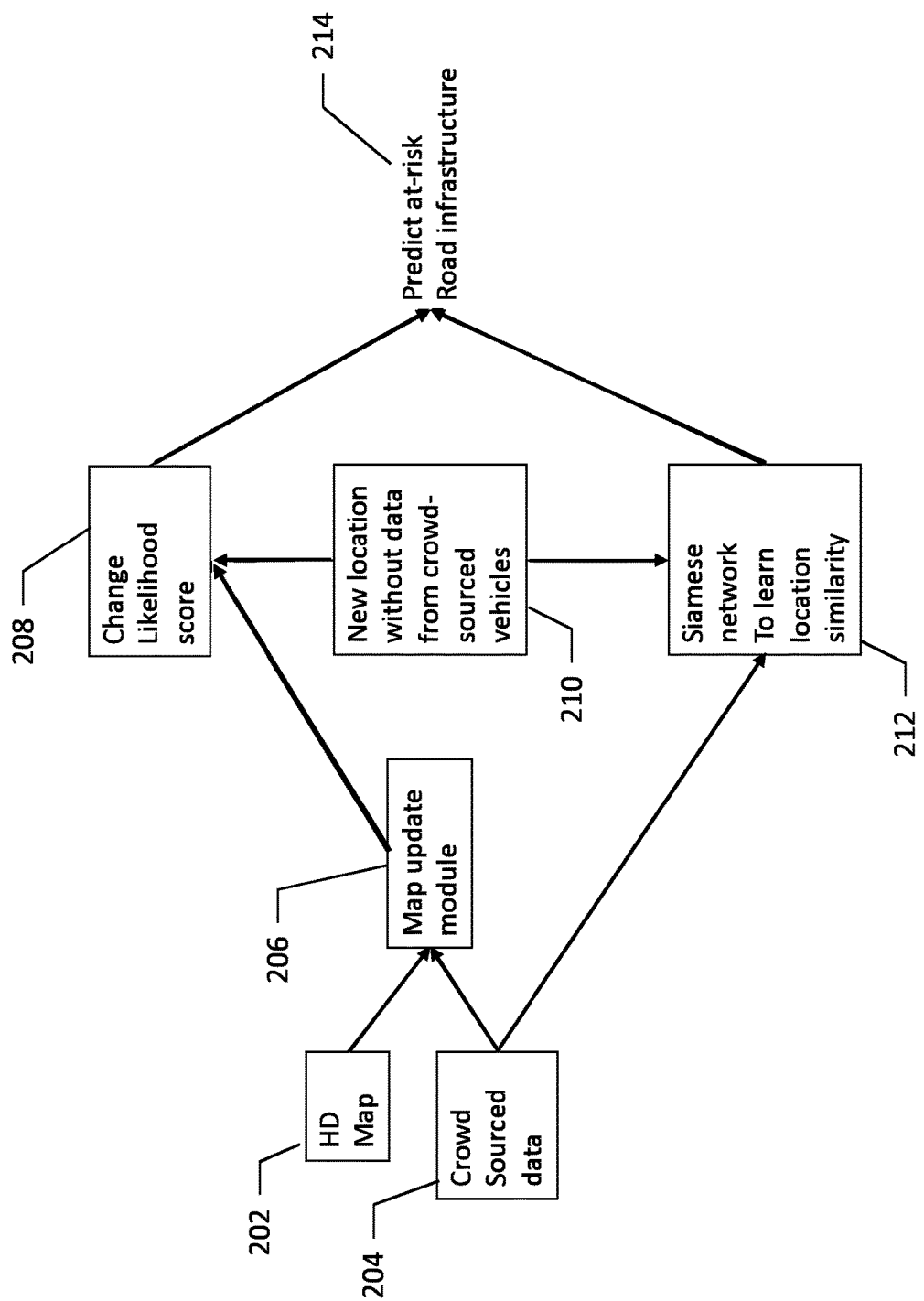
Figure 4:
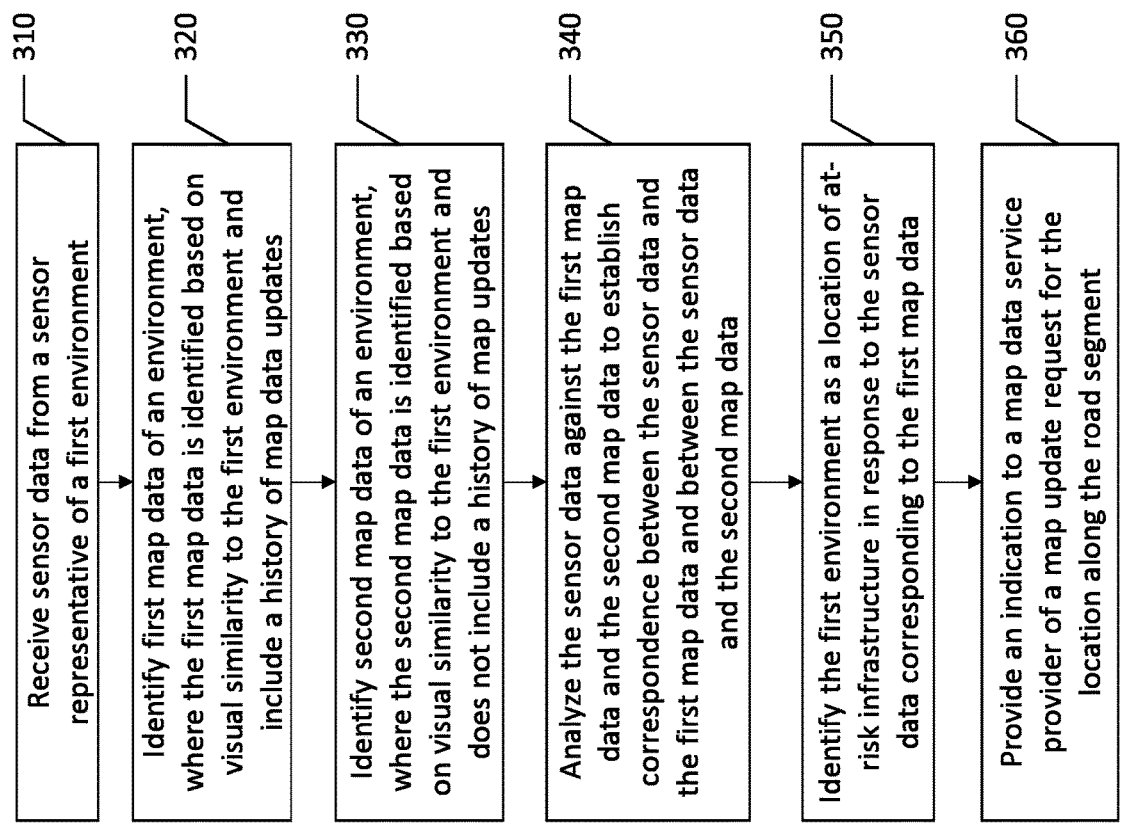

Having thus described certain example embodiments of the present disclosure in general terms, reference will hereinafter be made to the accompanying drawings, which are not necessarily drawn to scale, and wherein:

FIG. 1 is a block diagram of an apparatus according to an example embodiment of the present disclosure;

FIG. 2 is a block diagram of a system for constructing a high definition map from crowd sourced data and for predicting at-risk infrastructure within the mapped environment according to an example embodiment of the present disclosure;

FIG. 3 illustrates a message flow diagram for predicting at-risk road infrastructure according to an example embodiment of the present disclosure; and FIG. 4 is a flowchart illustrating the operations performed, such as by the apparatus of FIG. 1, for predicting the likelihood that road infrastructure has changed according to an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

As defined herein, a "computer-readable storage medium," which refers to a physical storage medium (e.g., volatile or non-volatile memory device), may be differentiated from a "computer-readable transmission medium," which refers to an electromagnetic signal.

A method, apparatus and computer program product are provided in accordance with an example embodiment in order to use crowd sourced sensor data to build, update, and/or repair a high definition map, and more particularly, to predicting at-risk road infrastructure from the sensor data gathered based on location similarity to other, known locations, and a likelihood of road infrastructure changes.

Vehicles equipped with sensors may drive along a road segment and produce probe data indicative of the road segment and properties/features thereof. Depending upon the capabilities of the sensors of the vehicle, data may include a path of the roadway, a travel speed along the roadway, imagery identifying lane lines or signage along the roadway such as speed limits, stop signs, etc., distance sensors such as Light Imaging, Detection, and Ranging (LIDAR) may provide locations and sizes of objects along a roadway, etc. In order to have sufficient coverage of and well-informed unbiased data related to geographic regions, road segments may require a plurality of probes to travel along a road segment to provide reliable data relating to the road segment. For example, due to inaccuracies in locationing mechanisms such as global positioning systems (GPS), the location identified by a vehicle probe along a road segment may actually be a location off of the road segment by several meters. Increasing the number of data points gathered by vehicle probes along a road segment mitigates errors in sensors such as GPS to achieve a more reliable crowd-sourced representation of the road segment and the data collected thereon.

Embodiments described herein may use an apparatus to collect and send probe data to a map services provider which may, in turn, build and update map data according to the collected data. The apparatus may optionally benefit from the collection and providing of probe data to the map services provider as the apparatus of example embodiments may provide route guidance to a user and/or may facilitate autonomous or semi-autonomous vehicle control. The apparatus of an example embodiment may be embodied by a variety of computing devices including, for example, a navigation system, an advanced driver assistance system (ADAS), a GPS system or the like. Additionally or alternatively, the apparatus may be embodied in other types of computing devices, particularly when crowd sourced probe data is used for map building by a map services provider, which may be embodied by a server, a computer workstation, a plurality of networked computing devices or the like, that are configured to communicate with or function as the map services provider as described herein. In this regard, FIG. 1 depicts the apparatus 10 of an example embodiment that may be embodied by various computing devices including those identified above. As shown, the apparatus of an example embodiment may include, may be associated with or may otherwise be in communication with a processor 12 and a memory device 14 and optionally a communication interface 16, one or more sensors 20, and/or a user interface 18.

While map building and updating may be performed using crowd sourced data to influence existing High Definition (HD) maps, embodiments of the present disclosure relate to identifying infrastructure changes. In order for an autonomous or semi-autonomous vehicle to accurately navigate an environment, an HD map of the environment may be necessary. Further, in order to be most representative of the environment, the HD map needs to be updated to maintain accuracy with respect to changes in the road infrastructure and the environment of the road network. Embodiments described herein go beyond map updates to predict road infrastructure changes based on a history of map updates and a likelihood of a road infrastructure change for a road.

Using the crowd sourced map data generated by a plurality of vehicles traveling along road segments of a road network, embodiments described herein may employ a predictive method for identifying regions of road infrastructure that might have changed, based on a history of map updates from similar regions. By predicting how likely road infrastructure has changed, the map update efforts can be focused on collecting data in such regions, ensuring seamless coverage for maintaining the HD map.

Referring again to FIG. 1, according to some embodiments, the processor 12 (and/or co-processors or any other processing circuitry assisting or otherwise associated with the processor) may be in communication with the memory device 14 via a bus for passing information among components of the apparatus 10. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 12 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 12 may be configured to execute instructions stored in the memory device 14 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 10 may be equipped with any number of sensors 20, such as a global positioning system (GPS) sensor/antenna, accelerometer, image sensor, LiDAR (Light Distancing and Ranging) sensor, radar, and/or gyroscopic sensor. Any of the sensors may be used to sense information regarding the movement, positioning, or orientation of the device for use in navigation assistance, as described herein according to example embodiments. In some example embodiments, such sensors may be implemented in a vehicle or other remote apparatus, and the information detected may be transmitted to the apparatus 10, such as by near field communication (NFC) including, but not limited to, Bluetooth™ communication, or the like.

The apparatus 10 of an example embodiment also optionally includes a communication interface 16 that may be any means such as a device or circuitry embodied in either hardware or a combination of hardware and software that is configured to receive and/or transmit data from/to other electronic devices in communication with the apparatus, such as by being configured to receive probe data from a sensor or plurality of sensors, and provide said probe data to a database, cloud storage or other external memory device associated with the map services provider. The communication interface may be configured to transmit and/or receive data, such as to or from a map services provider. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or additionally support wired communication.

As illustrated in FIG. 1, the apparatus 10 may optionally include or otherwise be in communication with a user interface 18. The user interface may include a touch screen display, a keyboard, a mouse, a joystick or other input/output mechanisms. In some embodiments, the user interface, such as a display, speakers, or the like, may also be configured to provide output to the user. In this example embodiment, the processor 12 may comprise user interface circuitry configured to control at least some functions of one or more input/output mechanisms. The user interface 18 may include, for example, a display to provide navigational assistance or route guidance to a user based on data received from the map services provider. The processor and/or user interface circuitry comprising the processor may be configured to control one or more functions of one or more input/output mechanisms through computer program instructions (for example, software and/or firmware) stored on a memory accessible to the processor (for example, memory device 14 and/or the like).

The apparatus 10 may support a mapping or navigation application so as to present maps or otherwise provide navigation or driver assistance. In order to support a mapping application, the computing device may include or otherwise be in communication with a geographic database, such as may be stored in memory 14. For example, the geographic database includes node data records, road segment or link data records, point of interest (POI) data records, and other data records. More, fewer or different data records can be provided. In one embodiment, the other data records include cartographic data records, routing data, and maneuver data. In order to fully utilize map data within the map database, accurate map-matching of probe data points to locations on the map, such as road segments or links, is necessary.

In example embodiments, a navigation system user interface may be provided to provide driver assistance to a user traveling along a network of roadways. Optionally, embodiments described herein may provide assistance for autonomous or semi-autonomous vehicle control. Autonomous vehicle control may include driverless vehicle capability where all vehicle functions are provided by software and hardware to safely drive the vehicle along a path identified by the vehicle through map-matching techniques described herein. Semi-autonomous vehicle control may be any level of driver assistance from adaptive cruise control, to lane-keep assist, or the like.

A map service provider database may be used to provide driver assistance via a navigation system and/or through an ADAS having autonomous or semi-autonomous vehicle control features. FIG. 2 illustrates a communication diagram of an example embodiment of a system for implementing example embodiments described herein. The illustrated embodiment of FIG. 2 includes a mobile device 104, which may be, for example, the apparatus 10 of FIG. 1, such as a mobile phone, an in-vehicle navigation system, an ADAS, or the like, and a map data service provider or cloud service 108. Each of the mobile device 104 and map data service provider 108 may be in communication with at least one of the other elements illustrated in FIG. 2 via a network 112, which may be any form of wireless or partially wireless network as will be described further below. Additional, different, or fewer components may be provided. For example, many mobile devices 104 may connect with the network 112. The map data service provider 108 may be cloud-based services and/or may operate via a hosting server that receives, processes, and provides data to other elements of the system.

The map data service provider may include a map database 110 that may include node data, road segment data or link data, point of interest (POI) data, traffic data or the like. The map database 110 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 110 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 110 can include data about the POIs and their respective locations in the POI records. The map database 110 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 110 can include event data (e.g., traffic incidents, construction activities, scheduled events, unscheduled events, etc.) associated with the POI data records or other records of the map database 110.

The map database 110 may be maintained by a content provider e.g., the map data service provider and may be accessed, for example, by the content or service provider processing server 102. By way of example, the map data service provider can collect geographic data and dynamic data to generate and enhance the map database 110 and dynamic data such as traffic-related data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them using vehicles and specifically configured sensor arrays with a high degree of accuracy, for example. Also, remote sensing, such as aerial or satellite photography and/or LIDAR, can be used to generate map geometries directly or through machine learning as described herein. However, the most ubiquitous form of data that may be available is vehicle data provided by vehicles, such as mobile device 104, as they travel the roads throughout a region, as described further below.

The map database 110 may be a master map database stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a physical storage format (PSF)) to organize and/or configure the data for performing navigation-related functions and/or services, such as route calculation, route guidance, map display, speed calculation, distance and travel time functions, and other functions, by a navigation device, such as by a vehicle represented by mobile device 104, for example. The navigation-related functions can correspond to vehicle navigation, pedestrian navigation, or other types of navigation. While example embodiments described herein generally relate to vehicular travel along roads, example embodiments may be implemented for pedestrian travel along walkways, bicycle travel along bike paths, boat travel along maritime navigational routes, etc. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the map data service provider 108 map database 110 may be a master geographic database, but in alternate embodiments, a client side map database may represent a compiled navigation database that may be used in or with end user devices (e.g., mobile device 104) to provide navigation and/or map-related functions. For example, the map database 110 may be used with the mobile device 104 to provide an end user with navigation features. In such a case, the map database 110 can be downloaded or stored on the end user device which can access the map database 110 through a wireless or wired connection, such as via a processing server 102 and/or the network 112, for example.

In one embodiment, as noted above, the end user device or mobile device 104 can include the apparatus 20 of FIG. 1 and can be embodied by an Advanced Driver Assistance System (ADAS) which may include an infotainment in-vehicle system or an in-vehicle navigation system, and/or devices such as a personal navigation device (PND), a portable navigation device, a cellular telephone, a smart phone, a personal digital assistant (PDA), a watch, a camera, a computer, and/or other device that can perform navigation-related functions, such as digital routing and map display.

An end user can use the mobile device 104 for navigation and map functions such as guidance and map display, for example, and for determination of useful driver assistance information, according to some example embodiments.

In order for the map database 110 to be effective, the map database should include as much detail regarding all road segments within a network of roads in order to provide the most accurate and efficient routing of vehicles through the network of roads. However, issues exist with gathering probe data relating to road segments, particularly those less traveled. Generating reliable data related to a road segment may be challenging when a road segment is not traversed by a specially-equipped vehicle specifically configured for map data generation and updating. Such vehicles may be employed by map data service providers; however, these vehicles cannot reasonably traverse every road segment of a region, particularly in view of changes to roadways that occur over time.

Advances in vehicle technology are resulting in more vehicles on the road with a greater degree of autonomy, which necessitates greater levels of sensor capability. The ubiquity of vehicles traveling along road segments with at least some degree of sensed data provides large volumes of data with respect to the road segments. However, the reliability of the crowd sourced data may be uncertain, such that potentially unreliable data may be provided by a vehicle for map building and updating at the map data service provider 108. Embodiments described herein mitigate erroneous crowd sourced data through a compilation of various data sources and reliance upon common data among the various data sources. Further, embodiments may reduce the complexity with which data sources are matched with one another for multi-source data collaboration to achieve more accurately mapped data from a plurality of sources.

With the vast expanse of roadways in the US and around the world, mapping of road networks is challenging, much less identifying changes to road infrastructure. Map data service providers are limited in the ability to maintain accurate and up-to-date maps and models of road networks. Given the ubiquity with which road segments are traveled by vehicles, and due to the ever-increasing sensor capabilities of these vehicles, crowd sourcing of information pertaining to the road segments may be instrumental in gaining efficiencies in road infrastructure change identification. A sensor-equipped vehicle traveling along a road segment may produce vast amounts of data relating to that road segment, and capitalizing on the available data may be beneficial for both users of the road network and map data service providers.

Embodiments described herein relate to autonomous riving, map building, updating, and repairing, and predicting/identifying road infrastructure changes. In order for autonomous or semi-autonomous vehicles to navigate an environment, in addition to on-board sensor capabilities, HD maps are required of the environment. Further, in order for the HD map to be most representative and accurate, the map needs to be updated and maintain synchronization with the real-world environment. While HD maps may exist along with crowd sourced data, embodiments of the present disclosure may predict road infrastructure changes given a history of map updates.

The issue of keeping maps, and particularly HD maps up to date is circular. Given enough data in a crowd sourced manner, locations that need to be updated can be identified. Further, given enough locations that require map updates, a map data service provider 108 may send out dedicate mapping vehicles to re-capture and process the map data for a specific location. Updating an HD map with crowd sourced data requires that data sources are first converted to a standard format, then aligned with the HD map. If a discrepancy between the data captured by the vehicle and the map exists, the map may be updated, while the confidence in the map update may be increased through consensus among crowd sourced data gathered for the location. However, the current state of technology does not and cannot predict which locations of a road network are most likely to require a map update, but rely upon data collected from that location to indicate whether a map change has occurred. Embodiments of the present disclosure break this cyclical dependency required for the map update step.

Embodiments described herein provide a predictive framework to identify regions of road infrastructure that might have changed based on a history of map updates from similar regions. By predicting how likely the road infrastructure has changed, map update efforts are focused on collecting crowd sourced in such regions for ensuring seamless coverage for maintaining the HD map. Embodiments provided herein may use a location similarity score, which is a metric that describes how similar two locations are, not just in terms of visual layout of the environment, but also in terms of how likely a map update is required for the regions. The location similarity score may be learned by using a Siamese network. Regions that are visually similar and also required a map update in the past and regions that are visually similar but did not require a map update in the past are input to the network. The network learns to differentiate the visual similarity from the map-update similarity. Once the network is trained, it can be used to look up similar locations, given a query for a location for which the map update needs to be performed.

According to example embodiments, once the network identifies that a location corresponding to one that requires a map update, the infrastructure change likelihood score is computed. The change likelihood is computed from a history of map updates for all features in the HD map, and is applied to the current scene. The final score, to predict whether a region might have undergone a change, and consequently a map update is needed, is the multiplication of the map update similarity and change likelihood scores. Such regions that correspond to high numerical values are those in which the road infrastructure might have changed.

Embodiments described herein relate to map building or map construction from crowd sourced data sources, such as data collected from original equipment manufacturers (OEMs), probe data (e.g., data from mobile phone service providers/manufacturers or navigational devices), and from "true" data gathered by specifically configured vehicles that traverse a road network gathering data in a known-reliable high-definition manner. Embodiments may build, update, or repair HD map information through collection of a plurality of instances of sensor data representing journeys along the road network. The raw-data sources can be from different sensor configurations or different sensor types, such as sensor 20 of FIG. 1, which may include LIDAR sensors or image sensors. Using crowd-sourced data and the existing HD map, embodiments described herein provide a technique of automated map building/updating using such data sources collected in a pre-specified region, and identifying at-risk infrastructure from among the roadways traveled within a road network. At-risk infrastructure or road infrastructure that is predicted to change or have changed can be identified even when the volume of crowd sourced data is low.

FIG. 3 illustrates a diagram of data flow to identify at-risk road infrastructure within a road network. HD map 202 data that has been previously generated is used as a basis. The HD map data may be from map database 110 of map data service provider 108. Crowd sourced map data 204 may be received from a plurality of vehicles traveling within a road network. The HD map data 202 and the crowd sourced data 204 may be input to the map update module 206, which may be embodied, for example, as processing server 102 of map data service provider 108. The map update module 206 is used to update map data based on the crowd sourced data 204. As shown, new location data without data from crowd-sourced vehicles 210 is received and used to determine whether the new location includes at-risk road infrastructure which may have changed. The new location information 210 is used as one input to a Siamese network 212 along with crowd sourced data 204 from other locations to establish a location similarity.

As shown in FIG. 3, a change likelihood score is computed from a history of map updates, where the map updates stem from map update module 206, compared against the new location which may lack crowd sourced data, but includes data representative of the road segment(s) at the new location. The current scene of the new location is analyzed at 208 with respect to features of the scene against a history of map updates for all features within the HD map as provided by map update module 206. This analysis generates a change likelihood value that is representative of the likelihood that road infrastructure changes exist at the new location of 210.

In addition to establishing a change likelihood, embodiments described herein establish a location similarity that describes how similar two locations are, not just in terms of visual layout of the environment, but also in terms of how likely the regions are to require a map update. The crowd sourced data of 204 is also provided to a Siamese network, as is the new location data 210. The Siamese network includes two neural networks, with each neural network receiving one of the crowd sourced data or the new location data. The two neural networks are fed to a contrastive loss function which calculates the similarity between the crowd sourced data and the new location data. The Siamese network differentiates between the new location data and the crowd sourced data to contrast the scenes in order to establish a location similarity, which may be produced in terms of a location similarity score.

Example embodiments use crowd sourced data input that is visually similar to the new location and required map updates in the past, and crowd sourced data input that is visually similar to the new location and did not require map updates in the past. The Siamese network learns to differentiate the visual similarity from the map update similarity. A trained Siamese network of example embodiments described herein can be used to take new location data and look up similar locations that have both had map updates and have not had map updates. In response to the Siamese network identifying that a new location corresponds to one that requires a map update, the change likelihood is calculated.

As shown in FIG. 3, a change likelihood score 208 of the new location is processed with the location similarity score 212 to establish whether the new location includes road infrastructure that is "at risk" or is predicted to have or to be changed. The identification of at-risk infrastructure informs a map data service provider of the need for a map update with respect to the new location. Map data service providers may use dedicated vehicles equipped with a highly accurate and complete sensor array deployed to regions in which at-risk infrastructure is identified. The at-risk infrastructure may be given a weighted score based on a change likelihood score multiplied by the location similarity score. This at-risk infrastructure score may be used to prioritize locations that require map updates, where higher scores for at-risk infrastructure indicate a greater need for a map update. Embodiments may implement an automated quality assurance of the map update operation as once a map update is complete, the change likelihood of the region can be determined to reaffirm the need to update the map in the same region.

FIG. 4 illustrates a flowchart of an apparatus, method and computer program product according to example embodiments of the invention. It will be understood that each block of the flowchart, and combinations of blocks in the flowchart, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 14 of an apparatus 10 employing an embodiment of the present invention and executed by a processor 12 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

According to the example embodiment of FIG. 4, sensor data from a sensor representative of a first environment is received at 310. First map data of an environment is identified at 320, where the first map data is identified based on visual similarity to the first environment and where the first map data includes a history of map updates. Second map data of an environment is identified at 330, where the second map data is identified based on visual similarity to the first environment and the second map data does not include a history of map updates. At 340, the sensor data is analyzed against the first map data and the second map data to establish correspondence between the sensor data and the first map data and between the sensor data and the second map data. The first environment is identified as a location of at-risk infrastructure at 350 in response to the sensor data corresponding to the first map data. An indication is provided at 360 to a map data service provider of a map update request for the location along the road segment.

In an example embodiment, an apparatus for performing the method of FIG. 4 above may comprise a processor (e.g., the processor 12) configured to perform some or each of the operations (310-360) described above. The processor may, for example, be configured to perform the operations (310-360) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 310-360 may comprise, for example, the processor 12 and/or a device or circuit for executing instructions or executing an algorithm for processing information as described above.

In some embodiments, certain ones of the operations above may be modified or further amplified. Furthermore, in some embodiments, additional optional operations may be included, some of which have been described above. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one non-transitory memory including computer program code instructions, the computer program code instructions configured to, when executed, cause the apparatus to at least:
   receive sensor data from a sensor, wherein the sensor data is representative of a first environment at a location along a road segment of a road network;
   identify first map data of a second environment, wherein the first map data is identified based on visual similarity to the first environment, wherein the first map data includes a history of map data updates;
   identify second map data of a third environment, wherein the second map data is identified based on visual similarity to the first environment, wherein the second map data does not include a history of map data updates;
   analyze the sensor data against the first map data and the second map data to establish a correspondence between the sensor data and one of the first map data and the second map data;
   identify the first environment as a location of at-risk infrastructure in response to the establishment of the correspondence between the sensor data and the first map data, wherein the location of at-risk infrastructure indicates the location requiring a map update; and
   provide an indication to a map data service provider of a map update request for the location along the road segment.

2. The apparatus of claim 1, wherein causing the apparatus to analyze the sensor data against the first map data and the second map data to establish the correspondence between the sensor data and one of the first map data and the second map data comprises causing the apparatus to:
   apply a Siamese network to the sensor data and the first map data to establish a contrast between the sensor data and the first map data; and
   apply the Siamese network to the sensor data and the second map data to establish a contrast between the sensor data and the second map data.

3. The apparatus of claim 2, wherein causing the apparatus to apply a Siamese network to the sensor data and the first map data comprises causing the apparatus to:
   differentiate visual similarity of the sensor data to the first map data from map update similarity of the sensor data to the first map data.

4. The apparatus of claim 1, wherein the apparatus is further caused to:
   identify a history of map updates for features in a map of the road network;
   identify features of the environment corresponding to features having a history of map updates; and
   determine a change likelihood based on the identified features of the environment corresponding to features having a history of map updates.

5. The apparatus of claim 4, wherein causing the apparatus to identify the first environment as a location of at-risk infrastructure in response to the establishment of the correspondence between the sensor data and the first map data comprises causing the apparatus to identify the first environment as a location of at-risk infrastructure in response to the establishment of the correspondence between the sensor data and the first map data and the change likelihood satisfying a predetermined criteria.

6. The apparatus of claim 1, wherein causing the apparatus to provide an indication to a map data service provider of a map update request for the location along the road segment comprises causing the apparatus to generate a request for map data collection at the location along the road segment.

7. The apparatus of claim 6, wherein the apparatus is further caused to provide an indication to an autonomous vehicle within a predefined distance of the location along the road segment of an uncertainty of road infrastructure at the location along the road segment.

8. A computer program product comprising at least one non-transitory computer-readable storage medium having computer-executable program code portions stored therein, the computer-executable program code portions comprising program code instructions configured to:
   receive sensor data from a sensor, wherein the sensor data is representative of a first environment at a location along a road segment of a road network;
   identify first map data of a second environment, wherein the first map data is identified based on visual similarity to the first environment, wherein the first map data includes a history of map data updates;

identify second map data of a third environment, wherein the second map data is identified based on visual similarity to the first environment, wherein the second map data does not include a history of map data updates;

analyze the sensor data against the first map data and the second map data to establish a correspondence between one of the first map data and the second map data;

identify the first environment as a location of at-risk infrastructure in response to the establishment of the correspondence between the sensor data and the first map data, wherein the location of at-risk infrastructure indicates the location requiring a map update; and provide an indication to a map data service provider of a map update request for the location along the road segment.

9. The computer program product of claim 8, wherein the program code instructions to analyze the sensor data against the first map data and the second map data to establish the correspondence between the sensor data and one of the first map data and the second map data comprise program code instructions to:

apply a Siamese network to the sensor data and the first map data to establish a contrast between the sensor data and the first map data; and apply the Siamese network to the sensor data and the second map data to establish a contrast between the sensor data and the second map data.

10. The computer program product of claim 9, wherein the program code instructions to apply a Siamese network to the sensor data and the first map data comprise program code instructions to:

differentiate visual similarity of the sensor data to the first map data from map update similarity of the sensor data to the first map data.

11. The computer program product of claim 8, further comprising program code instructions to:

identify a history of map updates for features in a map of the road network;

identify features of the environment corresponding to features having a history of map updates; and determine a change likelihood based on the identified features of the environment corresponding to features having a history of map updates.

12. The computer program product of claim 11, wherein the program code instructions to identify the first environment as a location of at-risk infrastructure in response to the establishment of the correspondence between the sensor data and the first map data comprises program code instructions to identify the first environment as a location of at-risk infrastructure in response to the establishment of the correspondence between the sensor data and the first map data and the change likelihood satisfying a predetermined criteria.

13. The computer program product of claim 8, wherein the program code instructions to provide an indication to a map data service provider of a map update request for the location along the road segment comprises program code instructions to generate a request for map data collection at the location along the road segment.

14. The computer program product of claim 13, further comprising program code instructions to provide an indication to an autonomous vehicle within a predefined distance of the location along the road segment of an uncertainty of road infrastructure at the location along the road segment.

15. A method comprising:

receiving sensor data from a sensor, wherein the sensor data is representative of a first environment at a location along a road segment of a road network;

identifying first map data of a second environment, wherein the first map data is identified based on visual similarity to the first environment, wherein the first map data includes a history of map data updates;

identifying second map data of a third environment, wherein the second map data is identified based on visual similarity to the first environment, wherein the second map data does not include a history of map data updates;

analyzing the sensor data against the first map data and the second map data to establish a correspondence between one of the first map data and the second map data;

identifying the first environment as a location of at-risk infrastructure in response to the establishment of the correspondence between the sensor data and the first map data, wherein the location of at-risk infrastructure indicates the location requiring a map update; and providing an indication to a map data service provider of a map update request for the location along the road segment.

16. The method of claim 15, wherein analyzing the sensor data against the first map data and the second map data to establish the correspondence between the sensor data and one of the first map data and the second map data comprises:

applying a Siamese network to the sensor data and the first map data to establish a contrast between the sensor data and the first map data; and applying the Siamese network to the sensor data and the second map data to establish a contrast between the sensor data and the second map data.

17. The method of claim 16, wherein applying a Siamese network to the sensor data and the first map data comprises:

differentiating visual similarity of the sensor data to the first map data from map update similarity of the sensor data to the first map data.

18. The method of claim 15, further comprising:

identifying a history of map updates for features in a map of the road network;

identifying features of the environment corresponding to features having a history of map updates; and determining a change likelihood based on the identified features of the environment corresponding to features having a history of map updates.

19. The method of claim 18, wherein identifying the first environment as a location of at-risk infrastructure in response to the establishment of the correspondence between the sensor data and the first map data comprises identifying the first environment as a location of at-risk infrastructure in response to the establishment of the correspondence between the sensor data and the first map data and the change likelihood satisfying a predetermined criteria.

20. The method of claim 15, wherein providing an indication to a map data service provider of a map update request for the location along the road segment comprises generating a request for map data collection at the location along the road segment.

* * * * *